(12) United States Patent
Bnayahu et al.

(10) Patent No.: US 8,972,938 B2
(45) Date of Patent: Mar. 3, 2015

(54) DETERMINING FUNCTIONAL DESIGN/REQUIREMENTS COVERAGE OF A COMPUTER CODE

(71) Applicant: International Business Machines Corporation, Armonk, NY (US)

(72) Inventors: Jonathan Bnayahu, Haifa (IL); Maayan Goldstein, Haifa (IL); Dany Moshkovich, Haifa (IL); Moti Nisenson, Haifa (IL); Yahalomit Simionovici, Haifa (IL); Shmuel Ur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/676,009

(22) Filed: Nov. 13, 2012

(65) Prior Publication Data

US 2013/0074039 A1 Mar. 21, 2013

Related U.S. Application Data

(63) Continuation of application No. 12/768,761, filed on Apr. 28, 2010, now abandoned.

(51) Int. Cl.
*G06F 9/44* (2006.01)
*H04M 11/04* (2006.01)
*G06F 11/36* (2006.01)

(52) U.S. Cl.
CPC .............. *G06F 8/10* (2013.01); *G06F 11/3676* (2013.01)
USPC ........... 717/123; 717/124; 717/127; 717/131; 455/404.2

(58) Field of Classification Search
CPC ..................................................... G06F 36/11
See application file for complete search history.

(56) References Cited

U.S. PATENT DOCUMENTS 6,192,511 B1 * 2/2001 Johnston et al. .............. 717/109
6,725,399 B1 4/2004 Bowman
(Continued)

FOREIGN PATENT DOCUMENTS

WO 2005045673 5/2005

OTHER PUBLICATIONS

Paul Piwowarski et al., "Coverage Measurement Experience During Function Test", [Online], 1993, pp. 287-301, [Retrieved from Internet on Oct. 18, 2014], <http://ieeexplore.ieee.org/stamp/stamp.jsp?tp=&arnumber=346035>.*
I. S. Dunietz et al., "Applying Design of Experiments to Software Testing", [Online], 1997, pp. 205-215, [Retrieved from Internet on Oct. 18, 2014], <http://delivery.acm.org/10.1145/260000/253271/p205-dunietz.pdf>.*
Alan W. Williams et al., "A Measure for Component Interaction Test Coverage", [Online], 1997, pp. 304-311, [Retrieved form Internet on Oct. 18, 2014], <http://ieeexplore.ieee.org/stamp/stamp.jsp?tp=&arnumber=934001>.*
(Continued)

*Primary Examiner* — Thuy Dao
*Assistant Examiner* — Ziaul A Chowdhury

(57) ABSTRACT

A method that includes: running a set of functional tests over a computer code; determining, for each code element of the computer code, which functional test covered it, to yield a tests-elements coverage map; associating portions of the computer code with corresponding design portions or requirements derived from a design document or a requirements document respectively, associated with the computer code, to yield a design/requirements-code tracing map; deriving, from the tests-code coverage map and the design/requirements-code tracing map, a design/requirements-tests coverage map, exhibiting coverage of the computer code by the functional tests, in terms of the design or the requirements, wherein at least one of the running, the determining, the associating, and the deriving is executed by at least one processor.

16 Claims, 7 Drawing Sheets

(56) References Cited

U.S. PATENT DOCUMENTS

| | | | |
|---|---|---|---|
| 6,748,584 B1* | 6/2004 | Witchel et al. | 717/136 |
| 7,188,336 B2* | 3/2007 | Humphries | 717/123 |
| 7,415,684 B2* | 8/2008 | Harer et al. | 716/106 |
| 7,624,380 B2* | 11/2009 | Okada | 717/125 |
| 7,779,374 B1* | 8/2010 | Hamid et al. | 716/136 |
| 8,037,453 B1* | 10/2011 | Zawadzki | 717/123 |
| 8,195,122 B1* | 6/2012 | Kahn et al. | 455/404.2 |
| 8,448,147 B2* | 5/2013 | Raz et al. | 717/130 |
| 8,606,538 B2* | 12/2013 | Cahon et al. | 702/123 |
| 2001/0010091 A1* | 7/2001 | Noy | 716/4 |
| 2002/0078401 A1* | 6/2002 | Fry | 714/30 |
| 2004/0102960 A1* | 5/2004 | Shimomura et al. | 704/9 |
| 2004/0123272 A1 | 6/2004 | Bailey et al. | |
| 2005/0044533 A1* | 2/2005 | Nesbit et al. | 717/124 |
| 2005/0278576 A1* | 12/2005 | Hekmatpour | 714/37 |
| 2008/0098349 A1 | 4/2008 | Lin et al. | |
| 2009/0019427 A1 | 1/2009 | Li et al. | |
| 2009/0222697 A1* | 9/2009 | Thakkar et al. | 714/38 |
| 2009/0287729 A1* | 11/2009 | Chen et al. | 707/102 |
| 2010/0058300 A1* | 3/2010 | Zeng et al. | 717/131 |
| 2010/0125618 A1* | 5/2010 | Dutta et al. | 707/822 |
| 2010/0131930 A1* | 5/2010 | Ben-Chaim et al. | 717/127 |
| 2011/0167413 A1* | 7/2011 | Kim et al. | 717/131 |
| 2013/0074039 A1* | 3/2013 | Bnayahu et al. | 717/123 |

OTHER PUBLICATIONS

William E. Howden, "A Functional Approach to Program Testing and Analysis", [Online], 1986, pp. 997-1005, [Retrieved from Internet on Oct. 18, 2014], <http://ieeexplore.ieee.org/stamp/stamp.jsp?tp=&arnumber=6313016>.*

Marco Lormans et al, "Reconstructing Requirements Coverage Views from Design and Test using Traceability Recovery via LSI", Proceeding TEFSE '05 Proceedings of the 3rd international workshop on Traceability in emerging forms of software engineering, pp. 37-42, 2005.

Technobuff, "Requirement Coverage—Another dimension to Unit Testing", Downloaded on Sep. 23, 2012. URL: http://www.technobuff.net/webapp/product/showTutorial.do?name=jrequire&tssar.

Steve Cornett, "Code Coverage Analysis", Bullseye Testing Technology 1996-2008, Sep. 15, 2012 URL:http://www.bullseye.com/coverage.html.

Karen N. Johnson, "Is functional testing sufficient to determine code coverage?", searchsoftwarequality, techtarget, Sep. 16, 2012. URL:http://searchsoftwarequality.techtarget.com/expert/KnowledgebaseAnswer/0,289625,sid92_gci1350915_mem1,00.html.

* cited by examiner

DETERMINING FUNCTIONAL DESIGN/REQUIREMENTS COVERAGE OF A COMPUTER CODE

CROSS-REFERENCE TO RELATED APPLICATION

This application is a continuation application of U.S. patent application Ser. No. 12/768,761 entitled, "DETERMINING FUNCTIONAL DESIGN/REQUIREMENTS COVERAGE OF A COMPUTER CODE", filed on Apr. 28, 2010 and is assigned to the same assignee in the present application, contents of which are incorporated by reference herein in its entirety.

BACKGROUND

1. Technical Field

The present invention relates to computer code testing and more particularly, to determining design/requirements coverage of functional tests for a given computer code.

2. Discussion of the Related Art

Functional tests are used throughout the life cycle of computer code development in order to verify that the computer code being developed meets the functional requirements or the design according to which the computer code has been written. The functional requirements are usually set forth in a specification document, possibly written in a natural language by the client. A design is then written, also in a natural language by a computer system engineer. The design contains high level description, in computer system terms, detailing how to address the requirements.

An important quantitative parameter in the code testing domain is the coverage of the design/requirements. The design/requirements coverage usually relates to the amount of the code that a given set of tests covers in terms of the design or the requirements according to which, the code has been written. Existing solutions for assessing the aforementioned coverage require explicit mapping between the design/requirements and the tests, either directly or indirectly in accordance with a specified model. Currently, there are no known methods to achieve such a coverage assessment without an explicit link between the design/requirements and the tests.

BRIEF SUMMARY

One aspect of the invention provides a method that includes: running a set of functional tests over a computer code; determining, for each code element of the computer code, which functional test covered it, to yield a tests-elements coverage map; associating portions of the computer code with corresponding design portions or requirements derived from a design document or a requirements document respectively, associated with the computer code, to yield a design/requirements-code tracing map; deriving, from the tests-code coverage map and the design/requirements-code tracing map, a design/requirements-tests coverage map, exhibiting coverage of the computer code by the functional, in terms of the design or the requirements, wherein at least one of the running, the determining, the associating, and the deriving is in operative association with at least one processor.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
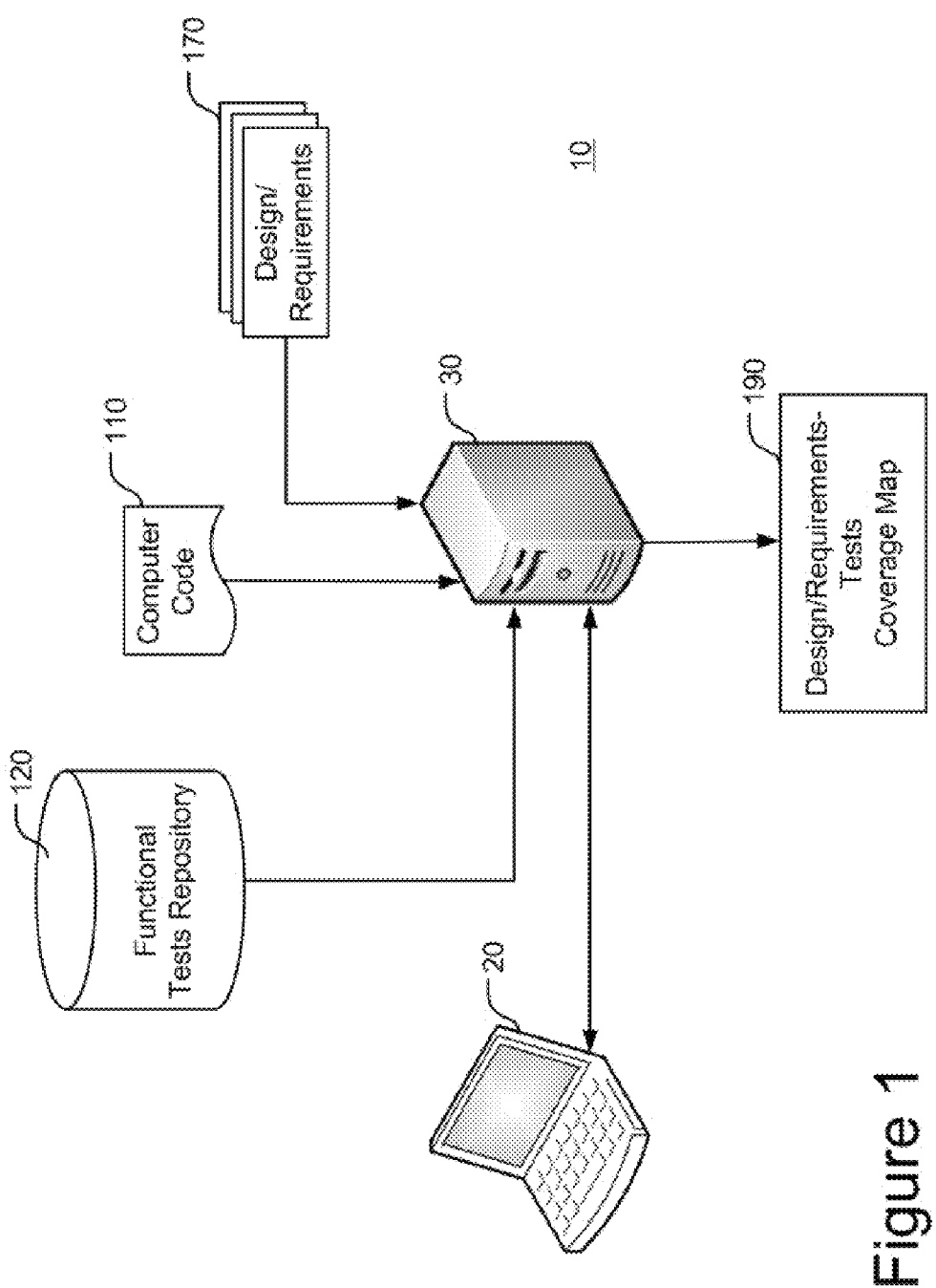
FIG. 1 is a high level schematic block diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "requirement" or "functional requirement" as used herein in this application refers to a requirement that defines a function of a software system or its component. A function is described as a set of inputs, the behavior, and outputs. Functional requirements may be calculations, technical details, data manipulation and processing and other specific functionality that define what a system is supposed to accomplish. Behavioral requirements describing all the cases where the system uses the functional requirements are captured in use cases. Functional requirements are supported by non-functional requirements (also known as quality requirements), which impose constraints on the design or implementation.

The term "design" as used herein in this application refers to a high level description, usually in computer system terms, detailing how to address the requirements. This document, usually written in natural language is usually written by a computer system engineer after reading the requirements document.

The term "system testing" as used herein in this application refers to testing conducted on a complete, integrated system to evaluate the system's compliance with its specified requirements. System testing falls within the scope of black box testing, and as such, should require no knowledge of the inner design of the code or logic.

The term "test coverage" or simply, "coverage" as used herein in this application refers to a measure used in system testing. It describes the degree to which the source code of a program has been tested. It is a form of testing that inspects the code directly and is therefore a form of white box testing.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an exemplary environment of a system according to some embodiments of the invention. According to the exemplary embodiment, computer network 10 may include a personal computer 20 connected to a server 30. It is understood however, that any type of computer may be used instead of server 30. Server 30 may be fed with computer code 110 and design/requirements 170. In addition, server 30 may be in communication with a functional test repository 120.

In operation, computer code 110, design/requirements 170, and tests from functional test repository 120 may be used by server 30 to generate a corresponding design/requirements-tests coverage map 190. Design/requirements-tests coverage map 190 indicates which design portions or requirements 170 are covered by computer code 110. The generation of design/requirements-tests coverage map 190 may include two stages. The first stage may include applying some of the tests functional test repository 120 to computer code 110 and summarizing the information of which functions and/or classes where covered by the tests. The second stage may include the use of traceability between code and documentation techniques. These techniques are based on information retrieval, and therefore do not require prior knowledge regarding the mapping between the code and the requirements. The code covered by the tests may be linked to the appropriate design portions or requirements, thus providing links between tests and the design portions or requirements or they cover.

Figure 2:
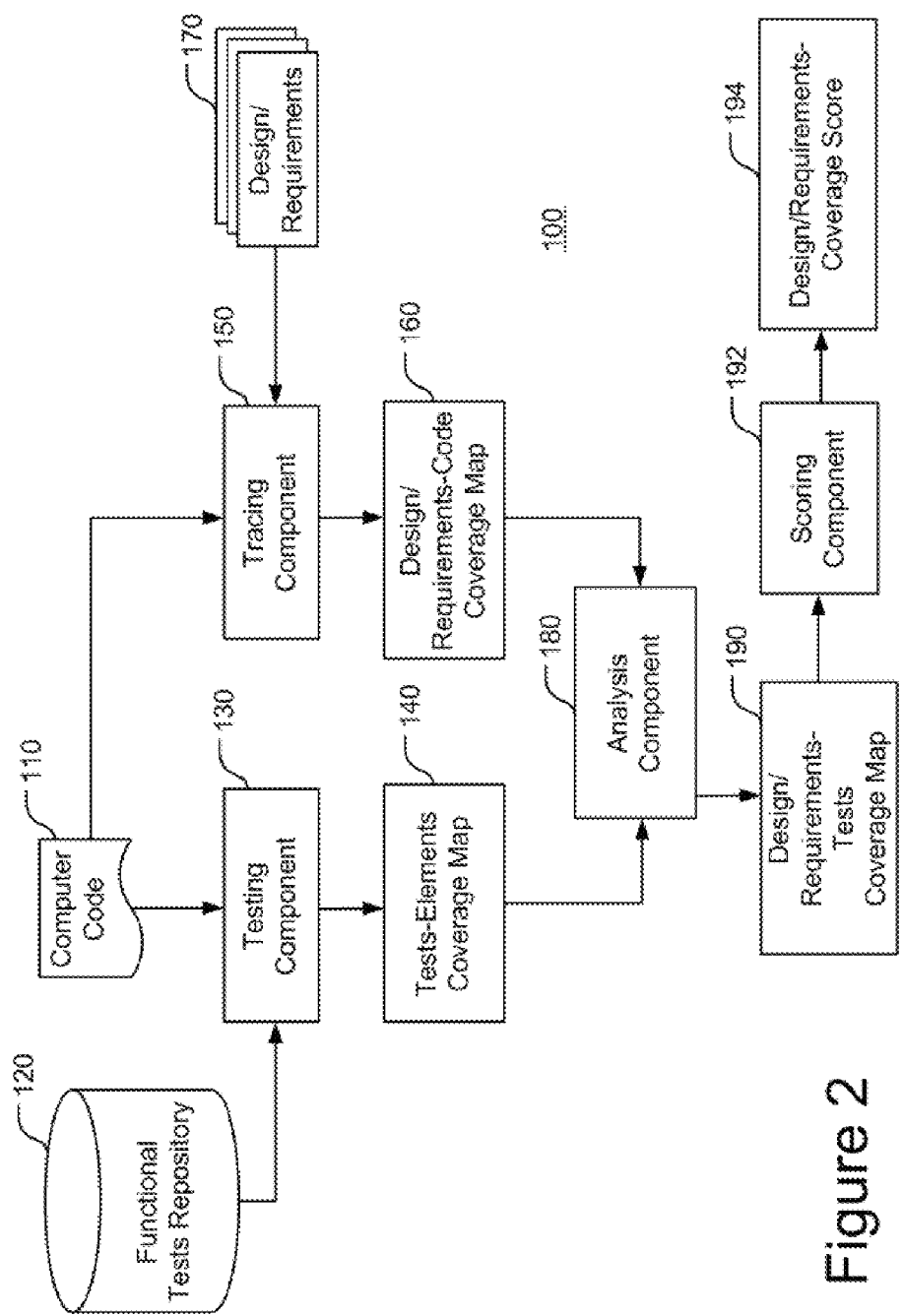
FIG. 2 is a high level schematic block diagram illustrating a system according to some embodiments of the invention.

FIG. 2 is a high level schematic block diagram illustrating a system 100 according to some embodiments of the invention. System 100 may include a testing component 130 being in operative association with a functional tests repository 120. System 100 may further include a tracing component 150 in operative association with design/requirements 170 which may be in the form of human generated documents. System 100 may further include an analysis component 180 and may in some embodiments, further include a scoring component 192.

In operation, testing component 130 is configured to run a set of functional tests selected from functional tests repository 120 on a computer code 110 and to determine, for each element of computer code 110, which of functional tests 120 covered it, to yield a tests-elements coverage map 140.

Tracing component 150 may be configured to associate portions of computer code 110 with corresponding design/requirements 170 associated with computer code 110 to yield a design/requirements-code tracing map 160.

Analysis component 180 may be configured to derive, from tests-code coverage map 140 and design/requirements-code tracing map 160, a design/requirements-tests coverage map 190 that presents coverage of the computer code by the functional tests, in terms of the design or the requirements.

According to some embodiments, scoring component 192 may be configured to apply a scoring function to requirements-tests coverage map 190, to yield a design/requirements-coverage score 194 for each of design/requirement 170, representing a test coverage in design/requirement terms, for each one of the functional tests of functional tests repository 120 that were run over computer code 110. According to other embodiments, scoring component 192 may be configured to apply a scoring function to design/requirements-tests coverage map 190, wherein the scoring function associates a specified weight for each one of design/requirements 170 in accordance with a respective importance index, to yield a requirements-coverage score 194 for the set of functional tests of functional tests repository 120 representing the set's coverage in design/requirement terms, in view of the respective importance index of respective design/requirements.

Figure 3:
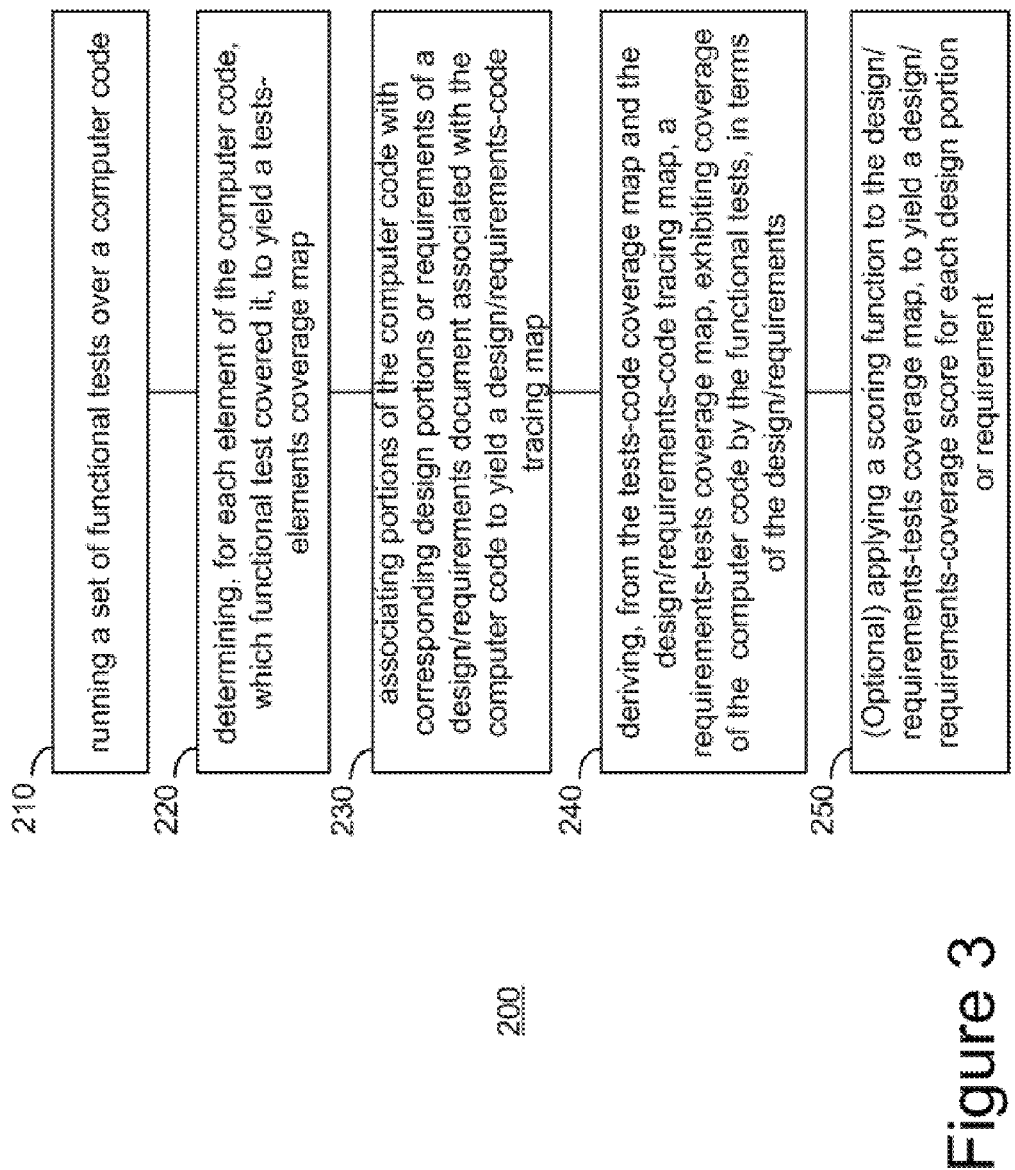
FIG. 3 is a high level flowchart diagram illustrating a method according to some embodiments of the invention.

FIG. 3 is a high level flowchart diagram illustrating a method 200 according to some embodiments of the invention. The method may include the following steps: running a set of functional tests over a computer code 210; determining, for each element of the computer code, which functional test covered it, to yield a tests-elements coverage map 220; associating portions of the computer code with corresponding design or requirements of a design/requirements document associated with the computer code to yield a design/requirements-code tracing map 230; and deriving, from the tests-code coverage map and the design/requirements-code tracing map, a design/requirements-tests coverage map, exhibiting coverage of the functional tests of the computer code, in terms of the design or the requirement 240.

In order to implement the aforementioned method, a computer (not shown) may receive instructions and data from a read-only memory or a random access memory or both. At least one of aforementioned running 210, determining 220, associating, and deriving 230 is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

According to some embodiments of the invention, method 200 may further include applying a scoring function to the requirements-tests coverage map, to yield a design/requirements-coverage score for each design portion or requirement, representing test coverage in requirement terms, for each one of the functional tests that were run over the computer code 250. Alternatively, the scoring function associates a specified weight for each one of the design/requirements in accordance with a respective importance index, to yield a design/requirements-coverage score for the set of functional tests representing the set's coverage in design/requirement terms, in view of the respective importance index of respective design/requirements.

According to a non-limiting exemplary embodiment, the aforementioned scoring function may include the following steps: initializing the coverage score for each design/requirement by $r_i=0$, for each i. Then, for each design/requirement retrieved, counting the number of links pointing to this design/requirement, $c_i$. Then, calculating the coverage score for a design/requirement using a normalization of the number of links pointing to that design/requirement, for example: $r_i=c_i/\Sigma\{c_j\}$. Finally, the output of the scoring function may show the design/requirements coverage scores $\{r_i\}$.

According to some embodiments of the invention, the computer code has been generated, either by a human developer, automatically, or semi-automatically in order to meet the design/requirements. At least some of the elements of the code that are the subject of the functional tests are functions and at least some of the tested elements are classes. The design/requirements, in turn are usually written in a natural language, possibly by a system engineer.

Figure 4:
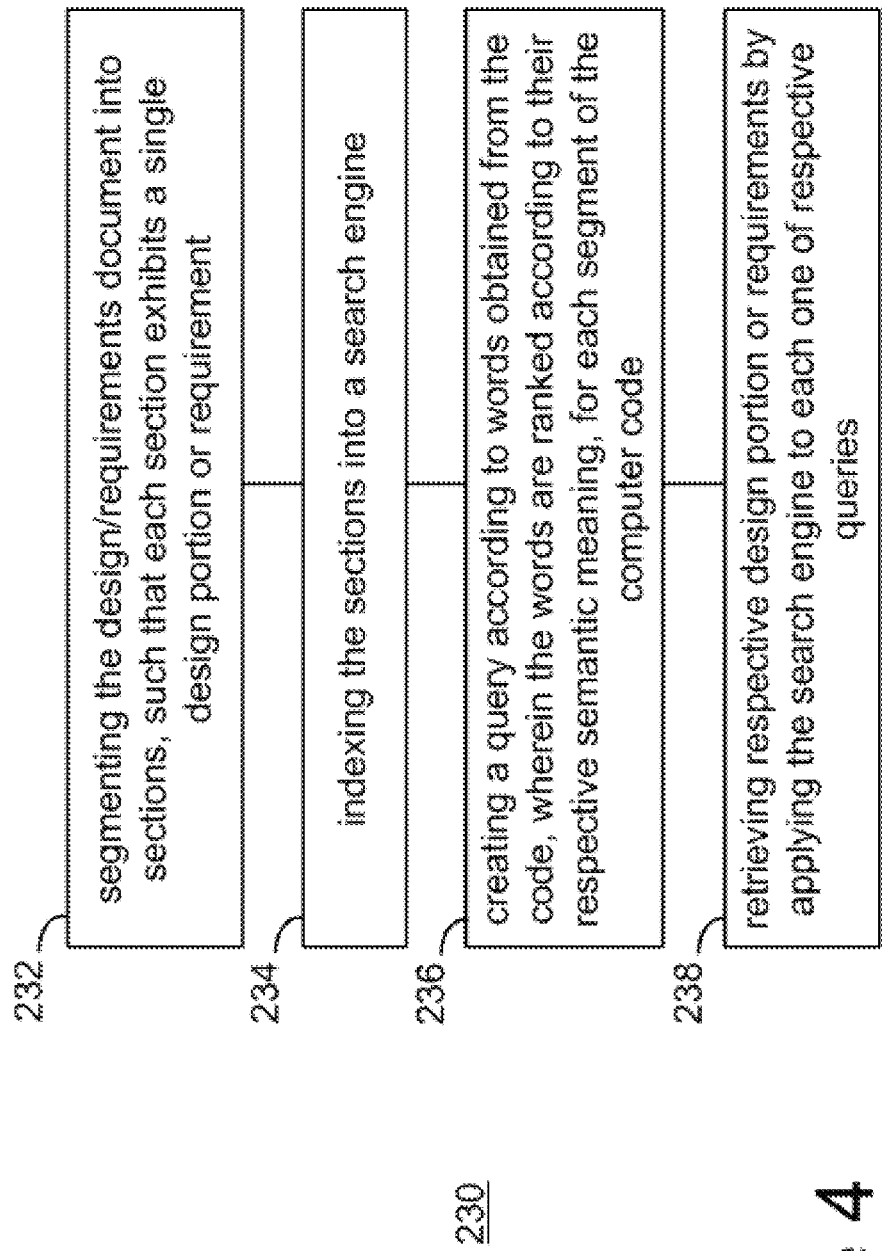
FIG. 4 is a high level flowchart diagram illustrating an aspect relating to the method according to some embodiments of the invention.

FIG. 4 is a high level flowchart diagram illustrating an aspect relating to method 200 according to some embodiments of the invention. The aforementioned step of associating portions of the computer code with corresponding design requirements to yield a design/requirements-code tracing map 230, may implement the use of traceability from code to requirements. Associating 230 may include the following steps: segmenting the design requirements document into sections, such that each section exhibits a single design portion or requirement 232; indexing the sections into a search engine 234; creating a query according to words obtained from the code, wherein the words are ranked according to their respective semantic meaning, for each segment of the computer code 236; and retrieving respective design/requirements by applying the search engine to each one of respective queries 238.

The following is a more detailed embodiment of the traceability process. The traceability process starts with segmentation of the design requirements document into sections, wherein each section comprises a single design portion or requirement. The segmentation may be followed by pre-processing each section using various techniques. Non-limiting examples of such techniques may include filter stop words (frequent words) and stemming. After pre-processing an indexing of all design/requirements segments into a search engine is performed. Then, given a code segment, the following process is performed in order to find the design/requirement(s) from which that section follows from: first, the given code is preprocessed using a pre-processing technique such as the aforementioned techniques. Then, words concatenated, for example, by CamelCase or underlines are separated. Subsequently, a query is created from the code. For example, for a Java class the following information may be used as words in creating the query: class name, public function names, class comments, public function arguments and return types, super class names and implemented interfaces, and public function comments. Then words are being ranked according to the semantic meaning of their respective source, Thus for example, a class name will be ranked higher than a comment. Finally, the query is being entered into the search engine to retrieve the related design/requirements.

Figure 5:
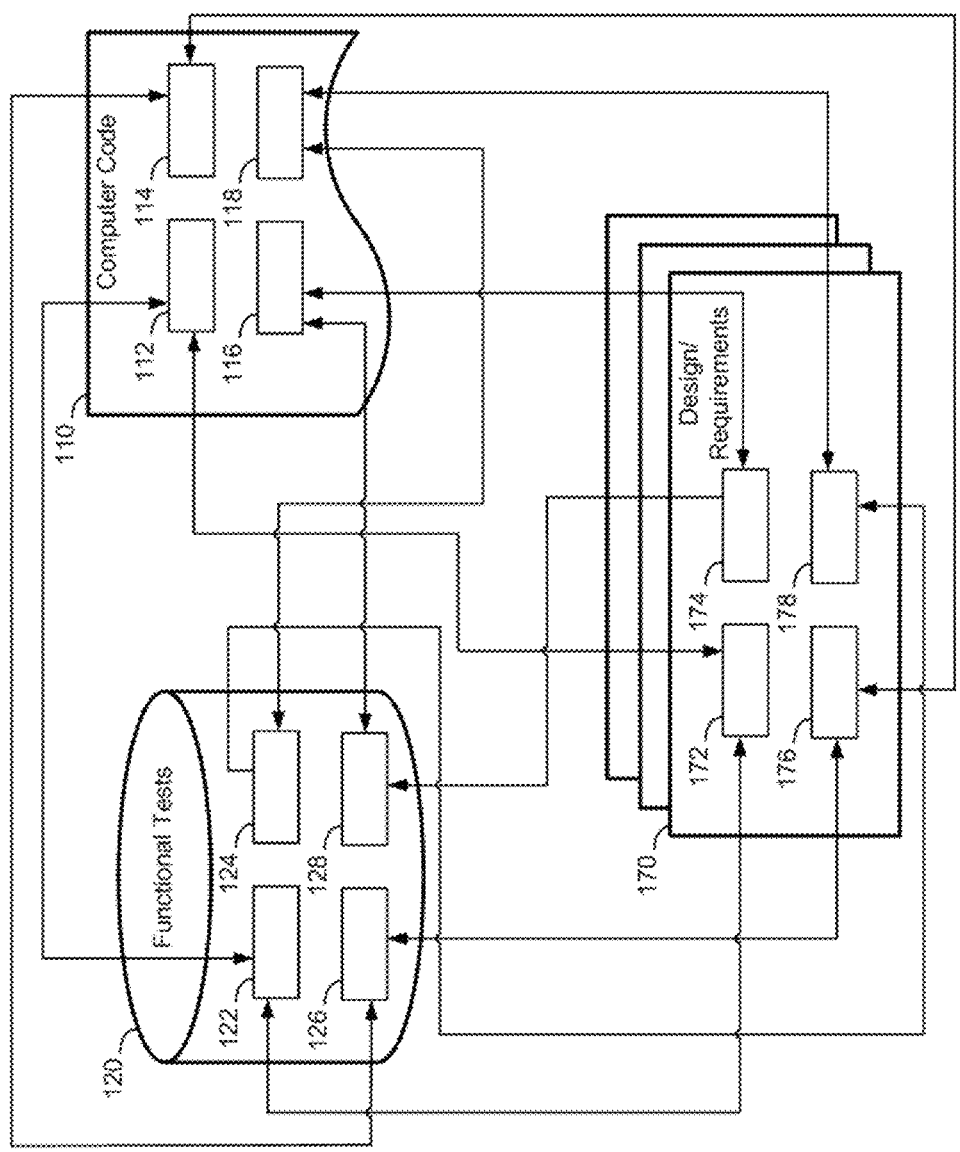
FIG. 5 shows a high level schematic block diagram illustrating an aspect according to some embodiments of the invention.

FIG. 5 shows a high level schematic block diagram illustrating an aspect according to some embodiments of the invention. Computer code 110 contains code elements (functions and/or classes) 112, 114, 116, and 118 is in operative association with functional test repository 120 which contains functional tests 122, 124, 126, and 128, and further in operative association with design/requirements documents 170 containing design/requirements 172, 174, 176, and 178. The diagram illustrates how each code element may be traced back to a respective design portion or requirement, in addition, how each code element may be associated with a respective test, and finally how the tracing and the association yield a mapping of tests to design/requirements. For example, code element 112 may determined to be tested by functional test 122. In addition, same code element 112 may be traced back to design/requirement 172. Thus, in embodiments of the aforementioned method, functional test 122 may be mapped into design/requirement 172.

In embodiments of the invention, test-code element coverage map 140, requirements-code coverage map 160, and design/requirements-test coverage map 190 may be in the form of tables or any other form of data structure that enables a description of bi-directional connection of pairs.

Figure 6:
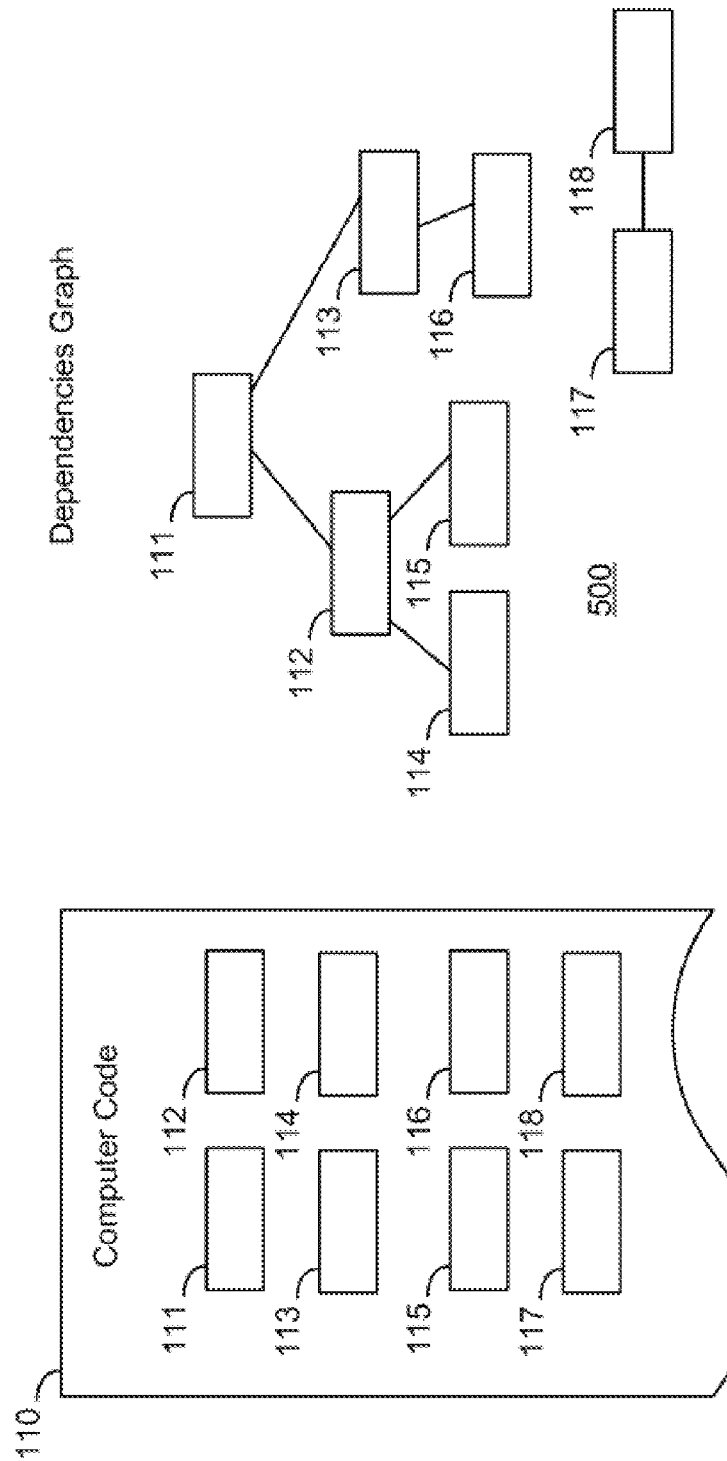
FIGS. 6A and 6B show a block diagram and a graph diagram respectively illustrating an aspect according to some embodiments of the invention.

FIGS. 6A and 6B show a block diagram and a graph diagram respectively illustrating an aspect according to some embodiments of the invention. In FIG. 6A, computer code 110 is shown, containing testable code elements (functions and/or classes) 111-118. FIG. 6B shows a respective graph 500 that shows the dependencies between code elements 111-118.

Figure 7:
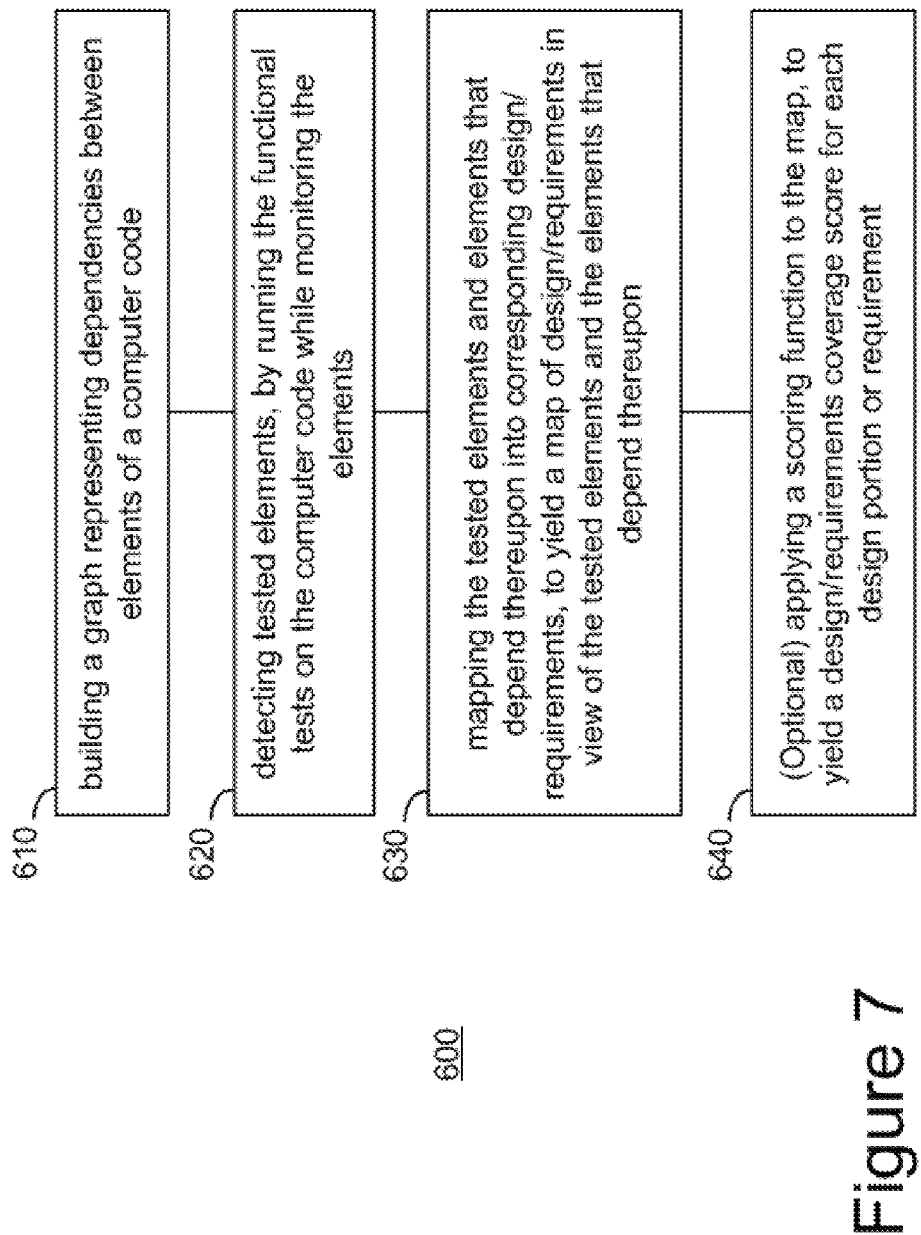
FIG. 7 is a high level flowchart diagram illustrating an aspect relating to the method according to some embodiments of the invention.

FIG. 7 is a high level flowchart diagram illustrating another aspect relating to the method according to some embodiments of the invention. There is provided a sub process for improving the results of method 200. Sub process 600 comprises: building a graph representing dependencies between elements of a computer code, wherein the computer code is associated with design or requirements, and a plurality of functional tests in a specified order 610; detecting tested elements, by running the functional tests on the computer code while monitoring the elements 620; mapping the tested elements and elements that depend thereupon in view of the graph, into corresponding design or requirements by tracing portions of the computer code to corresponding portions of the design requirements document, to yield a map of requirements in view of the tested elements and the elements that depend thereupon 630; and optionally applying a scoring function to the map, to yield a design/requirements coverage score for each requirement, representing a coverage in requirement terms, of the functional tests that were run on the computer code 640.

According to some embodiments of the invention, another sub process is provided for improving the precision of the coverage score of functions. Upon the completion of method 200 that yields the design/requirements-tests map and respective coverage score, for every class and/or function there is a list of design/requirements covered by this class/function. Specifically, some classes/functions may not point to all the design/requirements covered by them due to the nature of the aforementioned traceability technique. In order to address these issues, there is provided a sub process of improving the coverage score. The sub process may include the following steps: computing a dependencies graph (or a call graph in case where only functions are considered) between the code elements of the computer code as shown in FIG. 6B; extracting, for each design/requirement, all the code elements (function/classes) pointing to that design/requirement, based on the results achieved by the traceability technique; investigating, for each design/requirement, the dependencies tree to find all the elements that this element depends on; adding, for each element found in the previous step, a pointer to the relevant design/requirement, in case that it was not found during the aforementioned traceability step; and computing the coverage score of the design/requirement in accordance with aforementioned method 200.

According to some embodiments of the invention, another sub process is provided for improving the precision of the coverage score of functions. This may be achieved by generating a wider query which combines terms from both the tested elements and the elements that the tested elements depend from according to the dependencies graph.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:

running a plurality of functional tests over a computer code, said computer code comprising a plurality of code elements;

determining which of said plurality of functional tests covers each of said plurality of code elements, to yield a tests-code coverage map;

calculating a link between each of said plurality of code elements with a corresponding design portions or requirement of a design document or a requirements document respectively, to yield a design/requirements-code linking map, wherein said design or requirements document is written by a human in a natural language, wherein said calculating comprises semantic processing, and wherein said calculating further comprises segmenting said design or requirements document into a plurality of document sections, wherein each section has a single design portion or a single requirement; and indexing each of said plurality of sections into a search engine;

creating a query for each word obtained from each of said plurality of code elements, wherein each word is ranked according to its respective semantic meaning with respect to each of said plurality of code elements; and retrieving respective design portions or requirements by querying said search engine with said respective query for each word; and deriving a design/requirement-test coverage map from a matching between said tests-code coverage map and said design/requirements-code tracing map, said design/requirements-tests coverage map, representing coverage of said plurality of functional tests in terms of said design portions or said requirements;

wherein at least one of said running, determining, calculating, and deriving is executed by at least one processor.

2. The method according to claim 1, further comprising applying a scoring function to the design/requirements-tests coverage map, to yield a design/requirements-coverage score for each of said associated design portion or requirements, representing a test coverage score of said plurality of functional tests that has been run over said computer code.

3. The method according to claim 1, further comprising applying a scoring function to said design/requirements-tests coverage map, wherein said scoring function associates a specified weight for each one of said associated design portion or requirements in accordance with a respective importance index, to yield a weighted design/requirement-coverage score from said plurality of functional tests.

4. The method according to claim 1, wherein the associating comprising:
- segmenting said design or requirements document into sections, each section having a single design portion or a single requirement;
- indexing said sections into a search engine;
- creating a query according to words obtained from each of said plurality of code elements, wherein said words are ranked according to their respective semantic meaning; and
- retrieving said associated design portions or requirement by applying said search engine to each respective said query.

5. The method according to claim 1, wherein said computer code has been generated in order to comply with said associated design portions or requirements.

6. The method according to claim 1, wherein at least some of said plurality of code elements are functions and at least some of said plurality of code elements are classes.

7. The method according to claim 1, further comprising building a graph representing dependencies between a plurality of dependent code elements and said plurality of code elements, wherein said determining is further applied to each of said plurality of dependent code elements and said tests-code coverage map further relates to said plurality of dependent code elements.

8. A system comprising:
- a computerized processor;
- a computer readable memory;
- an interface for separately receiving a computer code and a design document or requirements document written by a human in natural language;
- a testing component stored in said computer readable memory and configured to:
  - run, using said computerized processor, a plurality of functional tests over said computer code, wherein said computer code comprises a plurality of code elements; and
  - determine which of said plurality of functional test covers each of said plurality of code elements, to yield a tests-code coverage map;
- a linking component stored in said computer readable memory and configured to calculate a link between said plurality of code elements with a corresponding design portions or requirement of the design document or requirements document respectively, to yield a design/requirements-code linking map, wherein said design or requirements document is written by a human in a natural language, wherein said calculating comprises semantic processing, and wherein said linking component is further configured to:
  - segment said design or requirements document into a plurality of document sections, wherein each section has a single design portion or a single requirement;
  - index each of said plurality of sections into a search engine;
  - create a query for each word obtained from each of said plurality of code elements, wherein each word is ranked according to its respective semantic meaning with respect to each of said plurality of code elements; and
  - retrieve respective design portions or requirements by querying said search engine with said respective query for each word; and
- an analysis component stored in said computer readable memory and configured to derive a design/requirement-tests coverage map from a matching between said tests-code coverage map and said design/requirements-code tracing map, said design/requirements-tests coverage map representing coverage of said plurality of functional tests in terms of said design portions or said requirements.

9. The system according to claim 8, further comprising a scoring component stored in said computer readable memory and configured to apply a scoring function to the design/requirements-tests coverage map, to yield a design/requirements-coverage score for each design portion or requirement, representing a test coverage score of said plurality of functional tests that said plurality of code elements were subjected to.

10. The system according to claim 8, further comprising a scoring component configured to apply a scoring function to said design/requirements-tests coverage map, wherein said scoring function associates a specified weight for each one of said corresponding design portions or requirement in accordance with a respective importance index, to yield a weighted design/requirements-coverage score from said plurality of functional tests.

11. The system according to claim 8, further comprising a builder component stored in said computer readable memory and configured to build a graph representing dependencies between a plurality of dependent code elements and said plurality of code elements, wherein said determining of said testing component is further applied to each of said plurality of dependent code elements and said tests-code coverage map further relates to said plurality of dependent code elements.

12. A computer program product, the computer program product comprising:
- a non-transitory computer readable storage medium having computer readable program embodied therewith, the computer readable program comprising:
- first computer readable program configured to separately receive a computer code and a design document or requirements document, wherein said documents are written by a human in a natural language;
- second computer readable program configured to run a plurality of functional tests over said computer code, wherein said computer code comprises a plurality of code elements; and
- third computer readable program configured to determine which of said plurality of functional tests covers each of said plurality of code elements, to yield a tests-code coverage map;
- fourth computer readable program is a stored linking component configured to associate portions of each of said plurality of code elements with a corresponding design portions or requirement of a design document or a requirements document respectively, to yield a design/requirements-code linking map, wherein said linking component is further configured to:
  - segment said design or requirements documents into a plurality of document sections, wherein each section has a single design portion or a single requirement;
  - index each of said plurality of document sections into a search engine;
  - create a query for each word obtained from each of said plurality of code elements, wherein each word is ranked according to its respective semantic meaning with respect to each of said plurality of code elements; and
  - retrieve respective design portions or requirements by querying said search engine with said respective query for each word; and
- fifth computer readable program configured to derive, a design/requirements-tests coverage map from matching between said tests-code coverage map and said design/requirements-code tracing map, said design/requirements-tests coverage map representing coverage of said plurality of functional tests in terms of said design portions or said requirements;

wherein said first, second, third, fourth, and fifth computer readable programs are stored on said non-transitory computer usable storage medium.

13. The computer program product according to claim 12, further comprising a sixth computer readable program configured to apply a scoring function to said design/requirements-tests coverage map, to yield a design/requirements-coverage score for each of said design portion or requirement, representing a test coverage score of said plurality of functional tests that said computer code was subjected to.

14. The computer program product according to claim 12, further comprising a seventh computer readable program configured to apply a scoring function to the design/requirements-tests coverage map, wherein said scoring function associates a specified weight for each one of said design portions or said requirements in accordance with a respective importance index, to yield a weighted design/requirements-coverage score for said plurality of functional tests.

15. The computer program product according to claim 12, further comprising an eighth computer readable program configured to build a graph representing dependencies between a plurality of dependent code elements and said plurality of code elements, wherein said determining of said testing component is further applied to each of said plurality of dependent code elements and said tests-code coverage map further relates to said plurality of dependent code elements.

16. The computer program product according to claim 13, wherein said computer code has been generated in order to comply with said design document or said requirements document.

* * * * *